UNITED STATES PATENT OFFICE.

HENRY RUPERT BRISSETT, OF LOWELL, AND JOHN HOWE, OF TYNGSBOROUGH, MASSACHUSETTS; SAID BRISSETT ASSIGNOR TO SAID HOWE.

COMPOSITION FOR COATING AND INSULATING UNDERGROUND WIRES.

SPECIFICATION forming part of Letters Patent No. 283,200, dated August 14, 1883.

Application filed May 19, 1883. (No specimens.)

*To all whom it may concern:*

Be it known that we, HENRY RUPERT BRISSETT, a subject of Victoria, Queen of the United Kingdom of Great Britain and Ireland, residing at Lowell, in the county of Middlesex and Commonwealth of Massachusetts, and JOHN HOWE, a citizen of the United States, residing at Tyngsborough, in said county and Commonwealth, have invented a new and useful composition to be used for coating and insulating underground wires employed as conductors of electricity, of which the following is a specification.

Our composition consists of the following ingredients combined in about the proportions stated, to wit: cotton-seed oil, thirty ounces; Venetian turpentine, thirty ounces; rosin, eighteen ounces; asphaltum, thirty-nine ounces; pulverized steatite, forty-eight ounces; paraffine, sixteen ounces; pine-tar, twelve ounces; sulphur, seventeen and one-half ounces; red lead, fifteen ounces. The six first-named ingredients are thoroughly mixed and heated to the boiling-point for about twelve hours. After the six first-named ingredients have boiled for about nine hours the pine-tar is added. Two hours later the sulphur and red lead are added, and about five minutes before the boiling ceases we add to the mixture from eighteen to thirty-six ounces of rosin, according as the composition is or is not to be allowed to season—the sooner the composition is to be used the greater the amount of rosin to be added.

The above-described composition is applied to the wires by hand or by other convenient means to form a coating about said wires, and pulverized soapstone or steatite is applied to the hands or to any surface to which it is desired to prevent the composition from adhering. The wires are wiped to free them from dust before the composition is applied, in order that the composition may adhere to the wires.

The composition above described is not rendered brittle by frost or dryness, but remains plastic and forms an excellent insulator for telegraph and telephone or other wires laid under ground or under water, and protects the wires from rust and corrosion. The cohesiveness of the composition may be increased by the addition of half an ounce of fine tow or other fibrous vegetable material just before the composition is taken off the fire.

We claim as our invention and desire to secure by Letters Patent of the United States—

The herein-described composition of matter to be used for coating and insulating underground wires, consisting of cotton-seed oil, Venetian turpentine, rosin, asphaltum, pulverized steatite, paraffine, pine-tar, sulphur, and red lead in substantially the proportions specified.

HENRY RUPERT BRISSETT.
JOHN HOWE.

Witnesses:
ALBERT M. MOORE,
E. W. THOMPSON.